Dec. 12, 1967 R. A. WOLFE 3,357,304
PHONOGRAPH-SLIDE PROJECTOR COMBINATION
Filed July 9, 1965 4 Sheets-Sheet 2
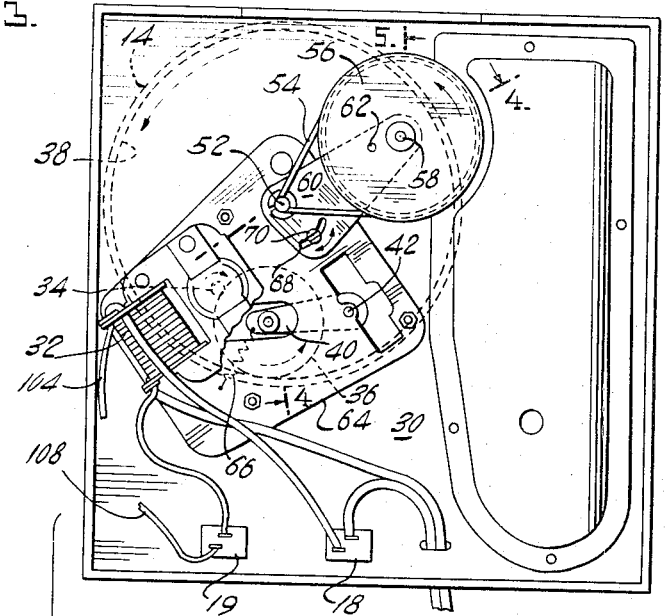
Fig. 3.
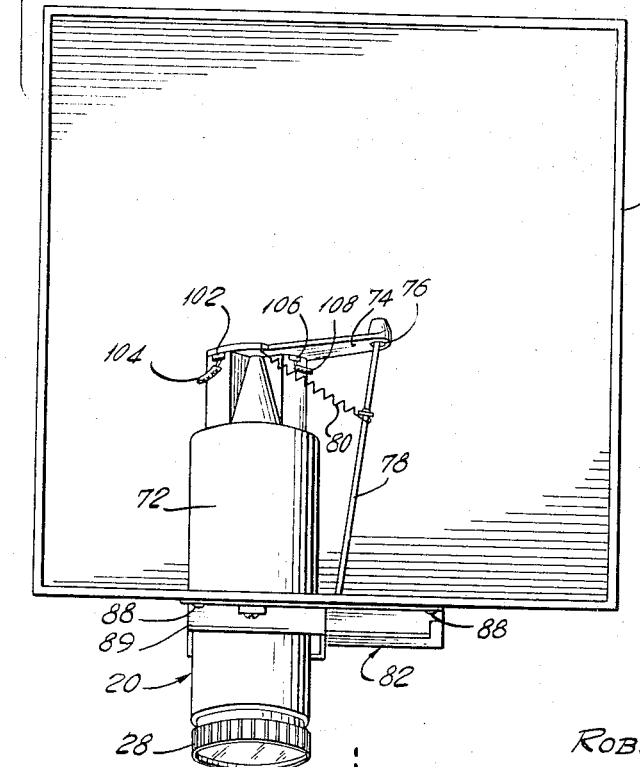
INVENTOR
ROBERT A. WOLFE
BY Nolte & Nolte
ATTORNEYS

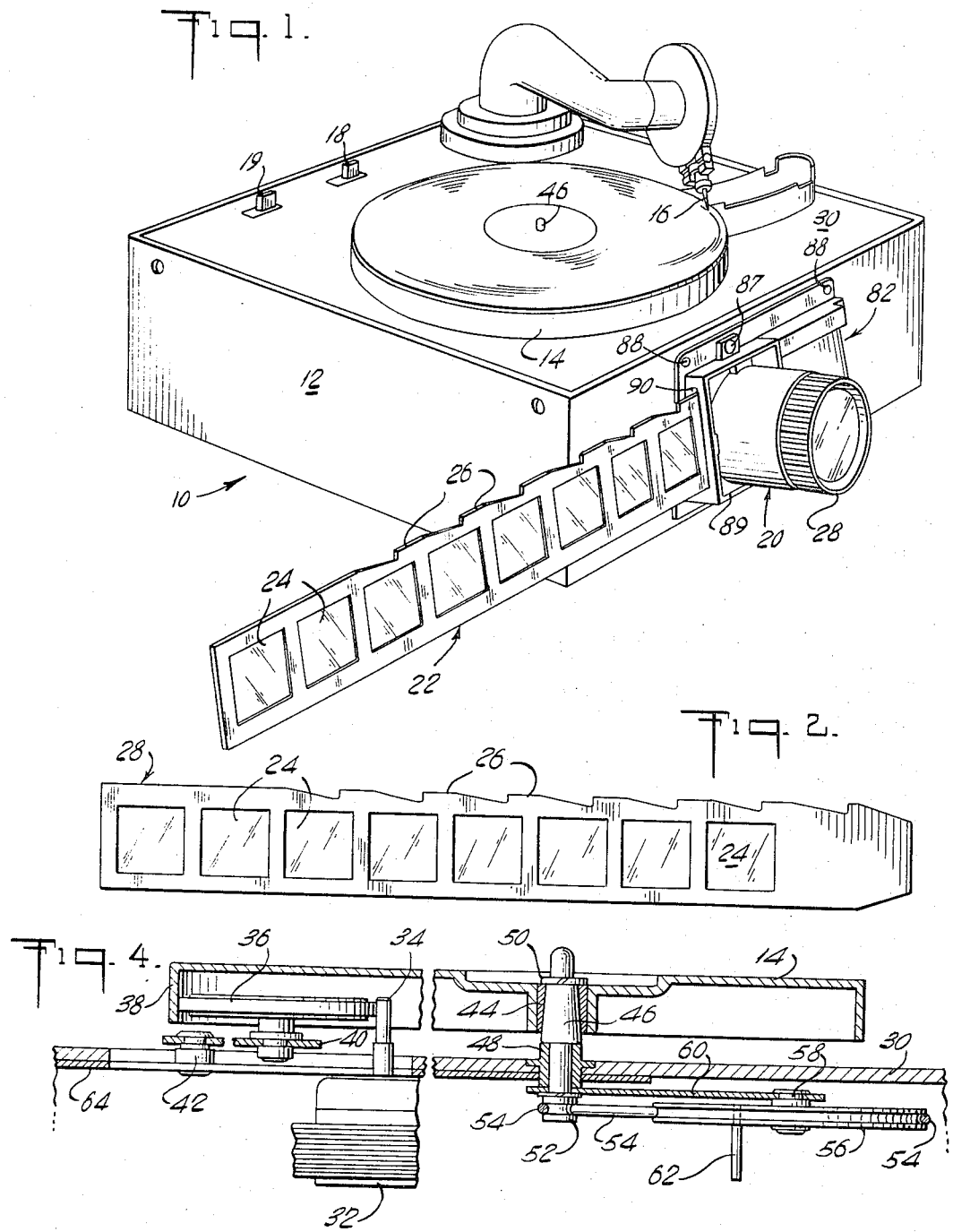

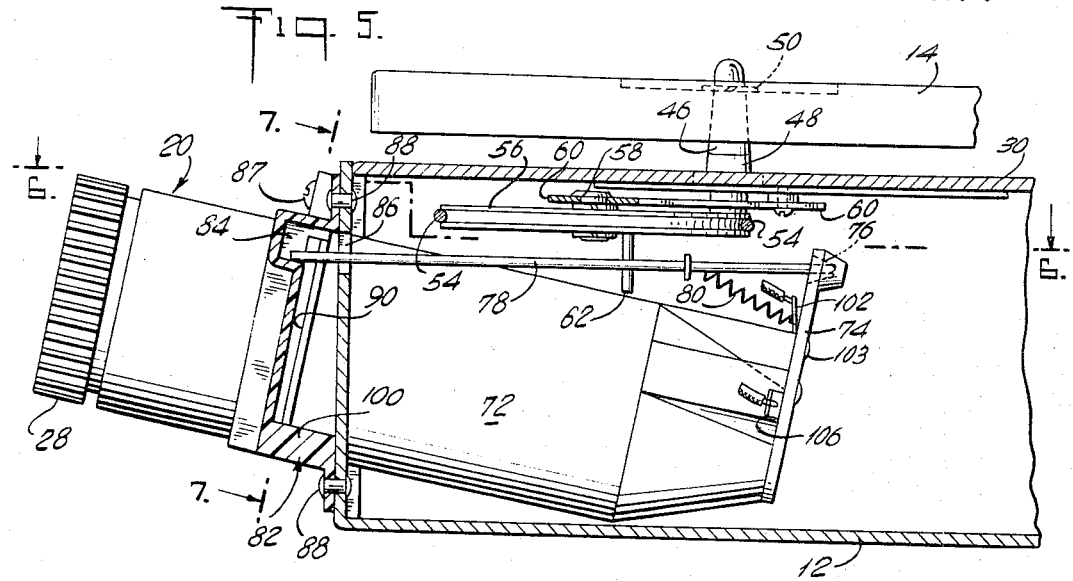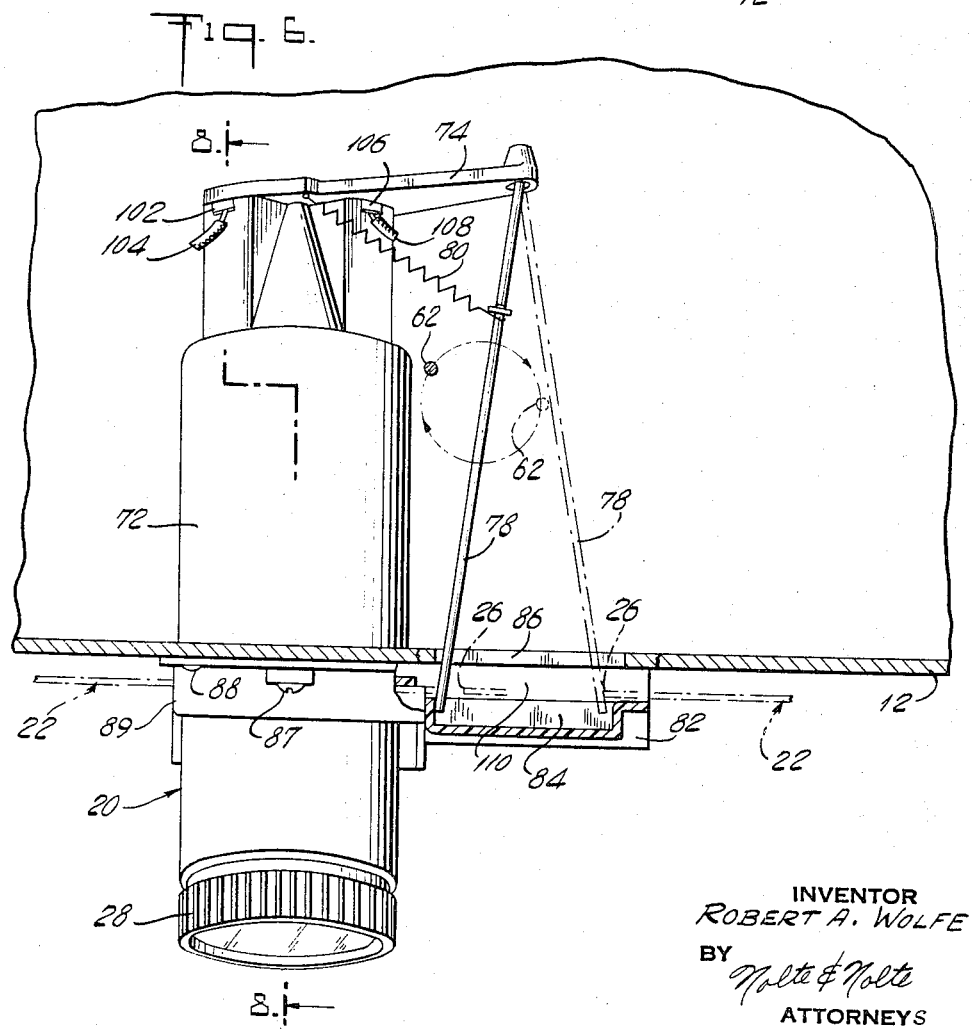

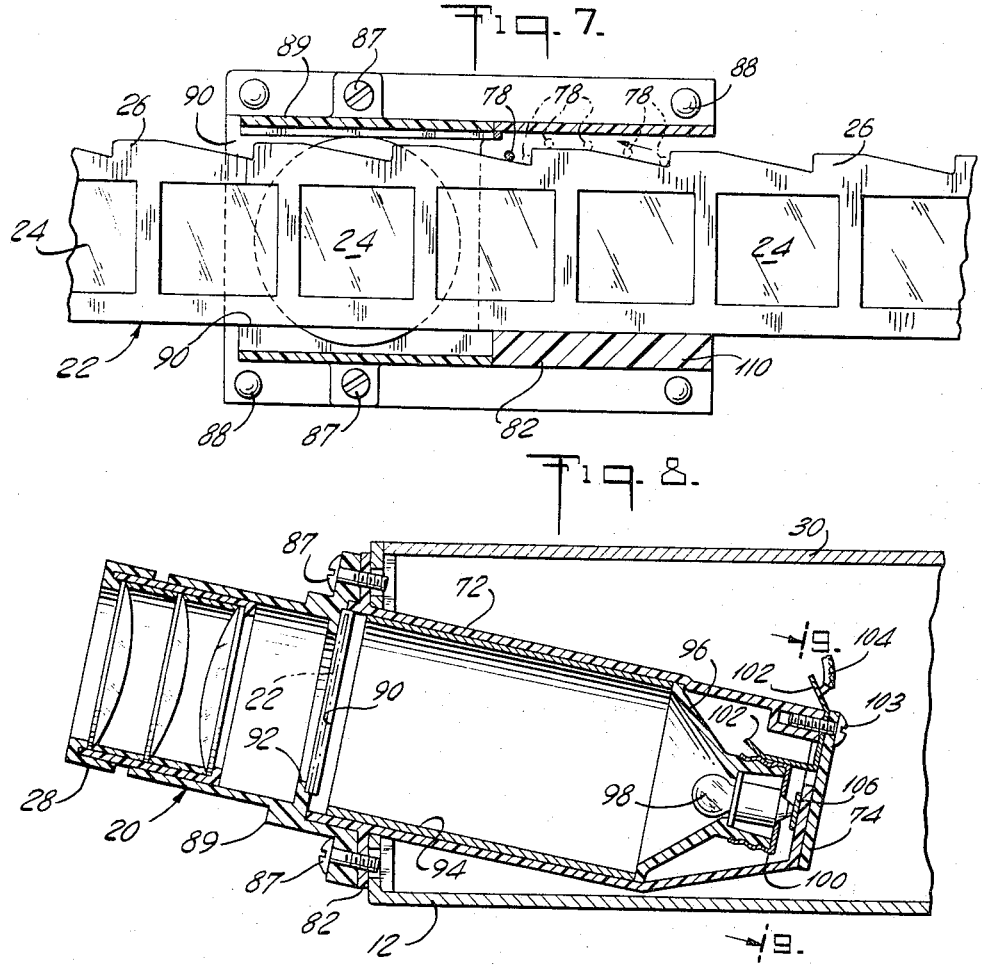

United States Patent Office 3,357,304
Patented Dec. 12, 1967

3,357,304
PHONOGRAPH-SLIDE PROJECTOR
COMBINATION
Robert A. Wolfe, 455 Elizabeth Ave.,
Newark, N.J. 07112
Filed July 9, 1965, Ser. No. 470,865
12 Claims. (Cl. 88—28)

ABSTRACT OF THE DISCLOSURE

An apparatus for providing correlated visual and oral information is disclosed which comprises a projector for projecting images from a series of slides onto a screen, a record player including a turntable for playing a series of recordings automatically one after the other, which respectively correspond to the series of slides. The apparatus also includes advancing means drivingly connected to the turntable and coacting with the projector for advancing one slide out of a projecting position and the next side of the series into the projecting position. More specifically, the advancing means includes a rod pivotally supported in the apparatus and pivotable from a rest position in which one of the slides is in a projecting position to a slide advancing position, and also includes a rotatable member, for instance a disc having a pin mounted thereon, which is drivingly connected to the turntable and movable along a path during a part of which the rotatable member displaces said rod from the rest position to the advancing position.

---

The present invention relates to apparatus for presenting information.

More particularly, the present invention relates to an apparatus which is capable of presenting correlated visual and aural information.

Of course, apparatus of this latter type is well known. For example, every sound movie presents correlated visual and aural information. However, at the present time when images of a series of slides are projected, it is customary for the operator of the projector to speak during the presentation of the images of the several slides.

One of the primary objects of the present invention is to provide an apparatus where recordings of descriptive material related to a series of slides are capable of being played back in correlation with the projection of images from the series of slides so that instead of an individual being required to speak during the presentation of images from a series of slides, it is possible with the apparatus of the present invention to have an automatic playing of recordings which are correlated with slides so that the visual and aural information can be presented in proper synchronism.

In particular it is an object of the present invention to provide an apparatus of this latter type which is exceedingly simple and inexpensive.

In addition, it is an object of the present invention to provide an apparatus of this type which can, with great ease, be incorporated into a substantially conventional record player of simple construction.

Furthermore, it is an object of the present invention to provide a construction which enables the advancing of a series of slides, one after the other to a projecting position, to be regulated so as to guarantee proper synchronization between the slides and the recordings.

In addition, it is an object of the present invention to provide an apparatus of the above type which enables correlation to be provided between a series of slides and a series of recordings which are situated one after the other on the same side of a disc.

It is furthermore an object of the present invention to provide an apparatus of the above type which is exceedingly simple to operate.

The apparatus of the present invention includes a record player which, insofar as playing of records is concerned, is of a conventional construction including a rotary turntable on which a disc record is capable of being placed so that the information recorded thereon can be played back. The record player means of the invention carries a projector means which is capable of projecting images from a series of slides, and this series of slides is mounted, in accordance with one feature of the invention, on a common elongated carrier means which is provided along one longitudinal edge with a series of teeth which respectively correspond to the series of slides.

An advancing means is carried by the record player means and cooperates with the teeth of the carrier means for advancing the latter by increments which will successively situate the slides at a proper position for having their images projected. This advancing means is driven directly from the rotary turntable with a transmission ratio which will guarantee that when the recording corresponding to one slide ends this one slide will be moved by the advancing means away from the projecting position while the next of the series of slides is simultaneously moved into the projecting position and while the next recording which corresponds to the next slide has been reached by the needle of the record player, so that the playing of the recording which corresponds to a given slide will commence simultaneously with the projecting of an image of the latter slide.

The invention is illustrated by way of example in the accompanying drawings which form part of the application and in which:

FIG. 1 is a perspective illustration of one possible embodiment of an apparatus according to the present invention;

FIG. 2 shows, in side elevation, a slide carrier means of the present invention;

FIG. 3 is a plan view of the structure of FIG. 1 showing in top plan the lower part of the record player and showing also in plan the underside of the top wall of the record player which in FIG. 3 has been swung to an inverted position so as to show clearly the structure which is carried at the underside of the top wall of the record player;

FIG. 4 is a stretched-out sectional elevation taken along line 4—4 of FIG. 3 and illustrating the transmissions of the invention;

FIG. 5 is a longitudinal sectional illustration, of the structure of the present invention, taken on line 5—5 of FIG. 3 and showing in particular how the record player and projector means are interconnected with each other;

FIG. 6 is a top plan view of the structure of FIG. 5 taken along line 6—6 of FIG. 5 in the direction of the arrows;

FIG. 7 is a transverse section taken along line 7—7 of FIG. 5 in the direction of the arrows and illustrating how the slides are advanced through the projector;

FIG. 8 is a longitudinal sectional illustration of the projector means of the invention, FIG. 8 being taken along the line 8—8 of FIG. 6 in the direction of the arrows; and FIG. 9 is a transverse section of the structure at the rear of the projector, FIG. 9 being taken along line 9—9 of FIG. 8 in the direction of the arrows.

Referring now to FIG. 1 there is illustrated therein a record player means 10 which, insofar as it is capable of playing records, is of a conventional construction. Thus the record player means 10 includes a housing 12 of generally rectangular configuration capable of being covered by any suitable cover which is not illustrated since it does not form part of the present invention. The record player means 10 includes a rotary turntable 14 on which a disc record is capable of being mounted. A needle 16 is capable of engaging the disc so as to play the record in a well known manner. Switch 18 is provided for starting and stopping the record player means 10, and switch 19 is for the light source referred to below.

This record player means 10 carries a projector means 20 which is capable of projecting a series of images from a series of slides 24 which are carried by a carrier means 22 in the form of an elongated member made of cardboard or the like and along which the series of slides 24 are arranged in a row. These slides 24 are in the form of suitable color transparencies or the like. One edge of the carrier means 22 is formed with a row of teeth 26 which respectively correspond to the series of slides 24 which respectively form part of an advancing means the remainder of which cooperates with the teeth 26 for advancing the slides 24, one after the other, to a projecting position where the images thereof will be projected by the projector means 20. Projector means 20 is provided with an adjustable objective 28 which is capable of providing a sharp image on a suitable screen or the like.

The disc which is mounted on the turntable 14 is provided on one side with a series of recordings respectively corresponding to the slides 24 and played one after the other as the needle 16 progresses toward the center of the disc while the latter rotates. The structure of the invention will automatically advance the slides 24 one after the other to the projecting position so that at any given time the part of the recording which is being played corresponds to the particular slide whose image appears on the screen.

Referring now to FIG. 4, it will be seen that the top wall 30 of the housing 12 carries at its underside, in the interior of the housing 12, a motor 32 which drives a rotary capstan 34 which presses against the outer periphery of a rotary driving wheel 36, the outer periphery of the wheel 36 being provided with a rubber tire or the like for the purpose of providing the desired friction between the capstan 34 and the rotary wheel 36. The turntable 14 has a downwardly directed flange 38 the inner surface of which is also frictionally engaged by the periphery of the wheel 36, so that in this way a transmission is provided for driving the turntable 14 from the motor 32. The rotary drive member 36 is supported for rotary movement by an elongated lever 40 which is itself pivotally mounted by a suitable pivotal support 42 carried by the top wall 30.

The central portion of the turntable 14 is fixed to the exterior surface of a sleeve 44 which has an inner frustoconical configuration mating with and wedged onto a corresponding frustoconical portion of a rotary shaft 46 which is supported for rotation in a suitable bearing 48 carried by the top wall 30 of the record player means 10. A snap ring 50 is situated in a groove of the shaft 46 just above the sleeve 44 so as to retain the turntable 14 on shaft 46, and due to the wedging engagement between the sleeve 44 and the shaft 46 is driven by the latter turntable 14 which is thus constrained to rotate with the shaft 46.

The bottom end of the shaft 46 extends into the interior of the housing 12 and fixedly carries a pulley 52 which drives a belt 54 which extends around and engages a rotary member 56 also in the form of a pulley, so that this rotary member 56 is also constrained to rotate. In this way the elements 52 and 54 form a transmission for driving the rotary means 56 in response to rotation of the turntable 14. It will be noted that because the diameter of the pulley 52 is so much smaller than the diameter of of the pulley 56, the latter will turn through one revolution only after the turntable 14 has turned through a given number of revolutions. The rotary means 56 is supported for rotary movement by a stud 58 which is carried by a lever 60. The rotary means includes in addition to the rotary member 56 a pin 62 which is spaced from the center of the rotary member 56 and which extends parallel to the axis thereof so that during each revolution of the rotary member 56 the pin 62 will describe a cylinder whose axis coincides with the axis of the rotary member 56.

Referring now to FIG. 3 there is shown therein the structure carried by the underside of the wall 30. Thus, both the field and armature of the motor 32 are shown, as well as the drive member 36. As may be seen from FIG. 3 a wall 64 is fixed to the underside of the wall 30 and is formed with an elongated slot through which part of the lever 40 is accessible, and a spring 66 is connected to one end of the lever 40 and to the wall 64 so as to urge the lever 40 to turn in a direction which presses the rotary member 36 on the one hand against the capstan 34 and on the other hand against the inner surface of the flange 38 of the turntable 14.

Also, FIG. 3 shows the rotary means 56 together with the pin 62 as well as the lever 60 which carries the pivot 58 for the rotary means 56. The lever 60 is formed with an arcuate slot 68 which extends along a circle whose center is in the axis of the shaft 46, and a screw 70 is threaded into the wall 64 and extends through the slot 68 so that by loosening the screw 70 the angular position of the lever 60 can be adjusted. Tightening of the screw 70 will retain the lever 60 in its adjusted position. In this way the location of the circular path of movement of the pin 62 can be adjusted for a purpose described below.

Referring to the lower part of FIG. 3, it will be seen that the projector means 20 extends through the front wall of the housing 12 and has itself a tubular housing 72 at the rear end of which is a projection 74 which is fixed to and projects from the housing 72 and which terminates in a hollow projection 76 forming a recess for receiving one end of an elongated rod 78 which forms part of the advancing means of the invention. A spring means 80 is connected at one end to the rod 78 and at its opposite end to part of the rear assembly of the projector means 20 for a purpose described below. When the top wall 30 is mounted on the remainder of the housing 12, the pin 62 is situated on the left side of the rod 78, as viewed in FIG. 3, and extends to an elevation lower than the rod 78, which has a rest position to which it is urged by the spring 80 and in which this rod 78 is situated in the path of turning of the pin 62. Thus, during each revolution of the rotary means 56, 62, the pin 62 will engage the rod 78 and deflect it in opposition to the spring 80, about the pivot formed by the engagement of the rear end of the rod 78 in the hollow projection 76, so that in this way the rod 78 is moved in one direction along a given stroke by the rotary pin 62 and then back to its rest position by the spring 80.

Referring now to FIGS. 5 and 6, it will be seen that the front wall of the housing 12 fixedly carries a hollow frame member 82 which is formed in its own front wall with an elongated hollow portion 84 which receives the front end of the rod 78. The front wall of the housing 12 is formed with an elongated slot 86 through which the rod 78 passes into the hollow elongated portion 84 without interference from the housing. As is apparent from FIGS. 5 and 6 the spring 80 acts downwardly, rearwardly, and to the left as viewed in FIG. 6, on the rod 78, so that this rod 78 is always urged to the solid line position shown in FIG. 6 as well as against the lower surface of the elongated hollow portion 84 of the frame 82. This frame 82 is permanently fixed, as by rivets 88, to the front wall of the housing 12. As is apparent from FIG. 6, during each revolution of the pin 62, it will engage the rod 78 and displace it to the dot-dash position shown in FIG. 6, whereupon the spring 80 will return the rod 78 to its initial position shown in solid lines in FIG. 6. It is furthermore to be noted that the actual deflection of the rod 78 in opposition to the spring 80 by the pin 62 takes place during less than 90 degrees of each revolution of the pin 62, so that quite a rapid deflection of the rod 78 from its solid to its dot-dash line position, shown in FIG. 6, is provided by the rotation of the pin 62.

As may be seen from FIGS. 7 and 8, a pair of screws 87 serve to fix to the frame 82 on objective support 89 which is thus removably mounted on the record player means, and this tubular objective support 89 supports the objective 28 for adjustable movement so that the image can be properly focused. This adjustable movement can be provided in any known way such as simply by manually engaging the knurled exterior ring of the objective 28 and longitudinally shifting the objective along the optical axis of the projector means 20.

The objective support 89 defines at its rear edge, with front edge portions of the frame 82, a pair of aligned slots 90 through which the elongated carrier means 22 is capable of passing so that the successive slides 24 can be shifted to the projecting position. Situated directly in front of the carrier means 22, at the portion thereof in the projector itself, is the projecting gate 92.

It is apparent particularly from FIG. 8 that the tubular project housing 72 is integral with the frame 82. The tubular housing portion 72 of the projector means 20 receives in its interior the elongated sleeve 94 which by frictional engagement with the inner surface of the housing 72 serves to retain therein the reflector 96 which receives the lamp 98 of the projector means. This lamp 98 has a base which is electrically connected with the exterior threaded sleeve 100 carried by the rear threaded tubular portion of the reflector 96, which is made of an electrically non-conductive material. A springy conductive member 102 is fixedly carried by the rear end of the projector means, engages the threaded sleeve 100, and extends from the latter to the exterior of the projector. It will be noted that the springy conductor 102 is fixed to the projector by a screw 103 which also serves to fix to the rear end of the projector the elongated projection 74 which is also made of an electrically non-conductive material. The end of the conductor 102 which is situated at the exterior of the projector is electrically connected with an elongated conductor 104.

The filament of the lamp 98 terminates in an electrically conductive portion which presses against a second elongated conductor 106 in the form of a leaf spring, or the like, which projects to the exterior of the projector where the conductor 106 is electrically connected with a second elongated conductor 108. The conductors 104 and 108 go to switch 19, similar to switch 18, for example, which thus may be actuated in order to turn the lamp 98 on and off so as to turn the projector means 20 on and off.

As is apparent from FIG. 7, the frame 82 has a lower wall 110 which engages the lower edge of the carrier means 22 in order to guide the latter for horizontal movement and the rod 78 is pressed against the upper edge of the carrier means 22 by the spring 80. The rod 78 is thus maintained in engagement with the teeth 26, and the rod 78, when in its rest position, has the solid line location shown in FIG. 7. Thus, in its rest position the rod 78 is in fact situated in advance of one of the teeth 26. When the pin 62 turns into engagement with the rod 78 this rod will be advanced to the right, as viewed in FIG. 7, so that it will initially move into engagement with one of the teeth 26 and will then advance the carrier 22 through a distance sufficient to situate the next slide in the projecting position, whereupon the spring 80 will, during the continued turning of the pin 62, return the rod 78 to its initial position in preparation for advancing the next slide into the projecting position.

Thus, through this exceedingly simple construction it is possible to advance the slides one after the other to the projecting position after the turntable 14 turns through a given number of revolutions. The side of the disc which is engaged by the needle 16 has thereon a series of recordings each of which is played in its entirety while the turntable 14 turns through the number of revolutions required to provide a single revolution of the pin 62. In this way, after each recording is played, another slide will be automatically situated in the projecting position during the playing of the next recording.

Thus, it is possible to have on hand a plurality of disc records and a plurality of carriers 22 each provided with a plurality of the slides 24, and each record and carrier 22, together with its series of slides, forms a set containing correlated visual and aural information. All the operator need do is insert the toothed end of the carrier 22 into the projector through the left slot 90, as viewed in FIG. 1, this being the only slot 90 which is visible in FIG. 1, and as the operator introduces the carrier 22, he will feel the rod 78 raise in opposition to the spring 80 as the first tooth 26 is passed beneath the rod 78 after which the latter snaps in front of this first tooth. The first slide 24 can now be properly positioned, after the operator has turned the lamp on, so as to align the image properly on the screen, and of course the objective 28 is focused at this time. Thereafter, all the operator need do is place the needle 16 at the start of the first recording, and then the record player can be turned on so that the operations can take place in the manner described above with the successive recordings being played simultaneously with the situation of the successive slides 24 respectively corresponding thereto at the projecting position. If it should be found that the series of images are not accurately synchronized with the sound, then it is a simple matter to loosen the screw 70 so as to adjust the location of the path of movement of the pin 62, and in this way proper adjustment can be made so that each slide will be properly positioned in correspondence with the particular recording which belongs thereto. Once all of the slides have been advanced to the projecting position the needle 16 will of course reach the end of the record, and the operator need only pull the carrier 22 out through the slot 90 opposite from that through which it was introduced. While a preferred embodiment of the invention has been described above, it is, of course, to be understood that the invention is not limited to this embodiment, but embraces all modifications within the scope of the appended claims.

What is claimed is:

1. Apparatus for providing correlated visual and aural information, comprising, projector means for projecting images from a series of slides, record player means including a turntable for playing a series of recordings, automatically one after the other, which respectively correspond to the series of slides, and advancing means drivingly connected to said record player means and coacting with said projector means for advancing one slide out of a projecting position and the next slide of the series into said projecting position when one of said series of recordings corresponding to one slide terminates and the next recording corresponding to the next slide is about to commence said advancing means including a rod pivotally supported in said apparatus and pivotable from a rest position in which one of the slides is in a projecting position to a slide advancing position, and rotatable means drivingly connected to said turntable and movable along a path during a part of which said rotatable means displaces said rod from said rest position to said advancing position.

2. An apparatus as recited in claim 1, wherein said rotatable means moves said rod during turning of said rotatable means through an arc of less than 90 degrees.

3. An apparatus according to claim 1, in which said rotatable means includes a member movable along a circular path during a part of which said member engages said rod and displaces the same from said rest position to said advancing position, and spring means urging said rod into said rest position.

4. Apparatus as recited in claim 1 and wherein said record player means includes a rotary turntable and a transmission driven by said rotary turntable and operatively connected to said rotary member for turning the latter in response to rotation of said turntable.

5. Apparatus as recited in claim 4 and wherein said transmission turns said rotary member through one revolution during turning of said turntable through a predetermined number of revolutions.

6. Apparatus for providing correlated visual and aural information, comprising, record player means having a rotary turntable, an elongated slide advancing rod, support means carried by said record player means and supporting said rod at one end thereof for swinging movement at said one end thereof, projector means for projecting a series of images from a series of slides, respectively, carrier means carrying said series of slides and having an elongated edge formed with a plurality of teeth respectively engaged by said rod, spring means maintaining said rod in engagement with the respective tooth, rotary means carried by said record player and turning along a path which displaces said rotary means into and out of engagement with said rod for actuating the latter to advance said carrier means for moving one slide after the other to a projecting position during successive revolutions of said rotary means, and transmission means driven by said turntable and operatively connected to said rotary means for turning the latter through one revolution after a given number of revolutions of said turntable.

7. Apparatus as recited in claim 6 and wherein said record player means carries a guide means engaging and guiding a free end of said rod distant from said one end thereof for movement back and forth along a path situated at an elevation lower than said teeth, said spring means urging said rod to said lower elevation so as to maintain said rod in engagement with said teeth and the stroke of said rod provided by said rotary means being sufficient to advance said rod from one tooth to the next during said revolution of said rotary means, while said rod advances said carrier means through a distance sufficient to displace one slide from a projecting position and the next slide into a projecting position.

8. In an apparatus as recited in claim 6, said projector means including a tubular housing carried by said record player means, a lamp support removably carried by said tubular housing in the interior thereof, objective means carried by said tubular housing at the exterior of said record player means, said objective means being removably connected to said tubular housing, and guide means forming part of said tubular housing and situated behind said objective for guiding said carrier means for movement.

9. Apparatus as recited in claim 8 and wherein said tubular housing carries at one end a projection formed with a recess receiving said one end of said rod to form said support means supporting said rod for swinging movement at said one end thereof.

10. Apparatus for providing correlated visual and aural information, comprising, record player means for playing a series of recordings one after the other, projector means carried by said record player means for projecting images of a series of slides respectively corresponding to said recordings, elongated carrier means carrying said series of slides and being formed along one edge with a plurality of teeth, an elongated slide-advancing rod engaging said teeth, support means supporting said rod for swinging movement in all directions at an end of said rod distant from said teeth, spring means engaging said rod for maintaining the latter in engagement with said teeth and for urging said rod to a given rest position, rotary means carried by said record player means and engaging said rod during each revolution of said rotary means for turning said rod in opposition to said spring means along a stroke which advances said carrier means to advance one slide away from a projecting position and the next slide into said projecting position where said next slide will have an image thereof projected by said projector means, said spring means returning said rod to said rest position during each revolution of said rotary means, transmission means driven by said record player means and operatively connected to said rotary means for rotating the latter, and adjusting means operatively connected to said rotary means for adjusting the latter so as to adjust the stroke of said rod.

11. Apparatus for providing correlated visual and aural information, comprising record player means for playing recordings which are provided on a disc, said record player means including a rotary turntable adapted to carry said disc and said disc having thereon recordings which are situated one after the other on said disc to be played one after the other during continuous rotation of said disc, projector means carried by said record player means for projecting images of a series of slides which respectively correspond to the plurality of recordings carried by said disc, elongated carrier means carrying said series of slides and having an elongated edge formed with a plurality of teeth, an elongated slide-advancing rod engaging said teeth, support means supporting said rod for movement back and forth along a given stroke to and from a rest position, spring means engaging said rod for urging the latter to said rest position, a rotary member supported for rotation by said record player means on one side of said rod, a rod-advancing pin carried by said rotary member for rotation therewith about the axis of said rotary member, said rod being situated in the path of movement of said pin to be advanced thereby in opposition to said spring means during each revolution of said pin for advancing said carrier means, said spring means returning said rod to said rest position also during each revolution of said pin, and transmission means driven by said record player means and operatively connected to said rotary member for rotating the latter and said pin therewith through one revolution during a plurality of revolutions of said turntable.

12. Apparatus as recited in claim 11 and wherein said rotary member is in the form of a pulley, said transmission including a belt engaging said pulley and a second pulley of a smaller diameter than said rotary member, directly connected coaxially to said rotary turntable for rotation therewith and also engaging said belt to drive the latter for rotating said rotary member during rotation of said turntable.

References Cited

UNITED STATES PATENTS

| 2,491,944 | 12/1949 | Abrahams et al. | 88—28 |
| 2,631,495 | 3/1953 | Ronick | 88—28 |
| 3,138,061 | 6/1964 | Greenaway | 88—28 |
| 3,207,033 | 9/1965 | Guber | 88—28 |
| 3,288,028 | 11/1966 | Sours | 88—28 |

NORTON ANSHER, *Primary Examiner.*

RICHARD SHEER, *Assistant Examiner.*